US006832310B1

(12) United States Patent
Bailey et al.

(10) Patent No.: US 6,832,310 B1
(45) Date of Patent: Dec. 14, 2004

(54) MANIPULATING WORK QUEUE ELEMENTS VIA A HARDWARE ADAPTER AND SOFTWARE DRIVER

(75) Inventors: Joseph A. Bailey, Austin, TX (US); Norman M. Hack, Pflugerville, TX (US); Clark L. Buxton, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 736 days.

(21) Appl. No.: 09/758,113

(22) Filed: Jan. 4, 2001

(51) Int. Cl.[7] .............................................. G06F 9/00
(52) U.S. Cl. ........................................ 713/1; 713/100
(58) Field of Search ................................ 713/1, 2, 100

(56) References Cited

U.S. PATENT DOCUMENTS

| | | | |
|---|---|---|---|
| 6,012,150 A | | 1/2000 | Bartfai et al. |
| 6,070,219 A | * | 5/2000 | McAlpine et al. .......... 710/263 |
| 6,192,389 B1 | | 2/2001 | Ault et al. |
| 6,647,423 B2 | * | 11/2003 | Regnier et al. ............. 709/229 |
| 2002/0071450 A1 | * | 6/2002 | Gasbarro et al. ........... 370/463 |
| 2002/0073257 A1 | * | 6/2002 | Beukema et al. ........... 710/105 |

OTHER PUBLICATIONS

*Intel Virtual Interface (VI) Architecture Developer's Guide*, Sep. 1998, p. 1–94.
*InfiniBand™ Architecture Specification*, vol. 1, Oct. 2000, Chapters 3, 9, and 10.

* cited by examiner

*Primary Examiner*—Dennis M. Butler
(74) *Attorney, Agent, or Firm*—Meyertons Hood Kivlin Kowert & Goetzel, P.C.; B. Noël Kivlin; Stephen J. Curran

(57) ABSTRACT

A method and apparatus for manipulating work queue elements via a hardware adapter and a software driver. The software driver is configured to cause a plurality of work queue elements to be stored in a queue pair including a plurality of storage locations. Each of the plurality of storage locations includes an indicator indicating whether a corresponding work queue element has been completed. The hardware adapter is configured to select one of the plurality of storage locations and to service a corresponding one of the plurality of work queue elements, and in response to completion of a task associated with the corresponding work queue element, to cause the indicator to indicate that the corresponding work queue element has been completed. Additionally, the software driver is configured to cause a new work queue element to be stored in the selected storage location in response to detecting that the indicator indicates that the corresponding work queue element has been completed.

24 Claims, 5 Drawing Sheets

| Virtual Address | Work Queue Element Information | Next Virtual Address | Next WQE Posted | Busy 310 |
|---|---|---|---|---|
| WQE_VA0 | | 0 | 0 | 0 |
| WQE_VA1 | | 0 | 0 | 0 |
| WQE_VA2 | | 0 | 0 | 0 |
| WQE_VA3 | | 0 | 0 | 0 |

QPx Driver Last WQE Accessed Register 215

QPx 210

MANIPULATING WORK QUEUE ELEMENTS VIA A HARDWARE ADAPTER AND SOFTWARE DRIVER

BACKGROUND OF THE INVENTION

1. Field of the Invention

This invention relates to computer systems and, more particularly, to network interconnection hardware and software.

2. Description of the Related Art

The use of modern computer systems is placing an increased demand on computer system network bandwidth. Higher performance system servers, mass storage devices and input/output devices with higher bandwidth and lower latency have been outpacing the existing interconnection technologies. Thus a system interconnection solution was needed that would overcome some of the bandwidth and latency problems associated with existing interconnection technologies.

One such interconnection solution is the Infiniband™ Switched Fabric. The Infiniband architecture is a point-to-point interconnection fabric where nodes are interconnected via switching devices. In particular, the Infiniband architecture describes a system area network in which independent processing nodes may be interconnected with I/O devices. The Infiniband architecture is described in detail in the Infiniband™ Architecture Specification available from the Infiniband™ trade association.

The Infiniband specification defines an interface between a processing node operating system and the node's hardware interface to the fabric. The hardware interface on a processing node is referred to as a hardware channel adapter. One fundamental idea behind Infiniband is the ability of a client process to place instructions in a queue, for the hardware to execute. The queue is referred to as a work queue. Each work queue is created in a pair called a queue pair. Each queue pair has a send queue and a receive queue. The queue pair creates a virtual communication port for a client process to communicate with other processes and end nodes. A queue pair is an abstract construct of memory locations and may have a predetermined number of entries that hold a predetermined number of work queue elements. An instruction is stored in the queue pair in the form of a work queue element. The hardware channel adapter services work queue elements in the order they are received into the queue pair.

Although the Infiniband specification describes a channel interface between the operating system and the fabric, the Infiniband specification does not specify how the hardware channel adapter or the software driving the hardware channel adapter must be implemented. Therefore, a solution is needed to bridge a host processing node to the Infiniband fabric.

SUMMARY OF THE INVENTION

Various embodiments of a method and apparatus for manipulating work queue elements are disclosed. In one embodiment, a hardware channel adapter may service work queue elements that are stored in a queue pair. The hardware channel adapter may include hardware registers that may track work queue elements that are currently being serviced and which work queue element will be serviced next. A software driver may cause the work queue elements to be stored in the queue pair. The software driver notifies the hardware channel adapter when there are new work queue elements to service. Additionally, each work queue element may include an indication of whether the work queue element has completed. The software driver may cause a new work queue element to be stored in the location previously occupied by the completed work queue element upon detecting the completion indication. Thus, the combination of the hardware channel adapter and the software driver may allow for work queue elements to be serviced in a first come first served manner even if the work queue elements become non-contiguous in memory due to the availability of free locations resulting from out of order completions and subsequent use of those free locations by the software driver as it adds new work queue elements to the queue.

Broadly speaking, in one embodiment, an apparatus including a software driver and a hardware adapter is contemplated. The software driver is configured to cause a plurality of work queue elements to be stored in a queue pair including a plurality of storage locations. Each of the plurality of storage locations includes an indicator indicating whether a corresponding work queue element has been completed. The hardware adapter is configured to select one of the plurality of storage locations and to service a corresponding one of the plurality of work queue elements, and in response to completion of a task associated with the corresponding work queue element, to cause the indicator to indicate that the corresponding work queue element has been completed. Additionally, the software driver is configured to cause a new work queue element to be stored in the selected storage location in response to detecting that the indicator indicates that the corresponding work queue element has been completed.

In one particular implementation, the hardware adapter includes a first register for storing a virtual address of the selected storage location and the corresponding work queue element. The hardware adapter further includes a second register for indicating a number of pending work queue elements remaining to be serviced. The software driver is further configured to notify the hardware adapter when the new work queue element is stored by causing the virtual address of the new work queue element to be written to the first register of the hardware adapter. The hardware adapter is further configured to increment the second register in response to receiving the nofification from the software driver.

Figure 1:
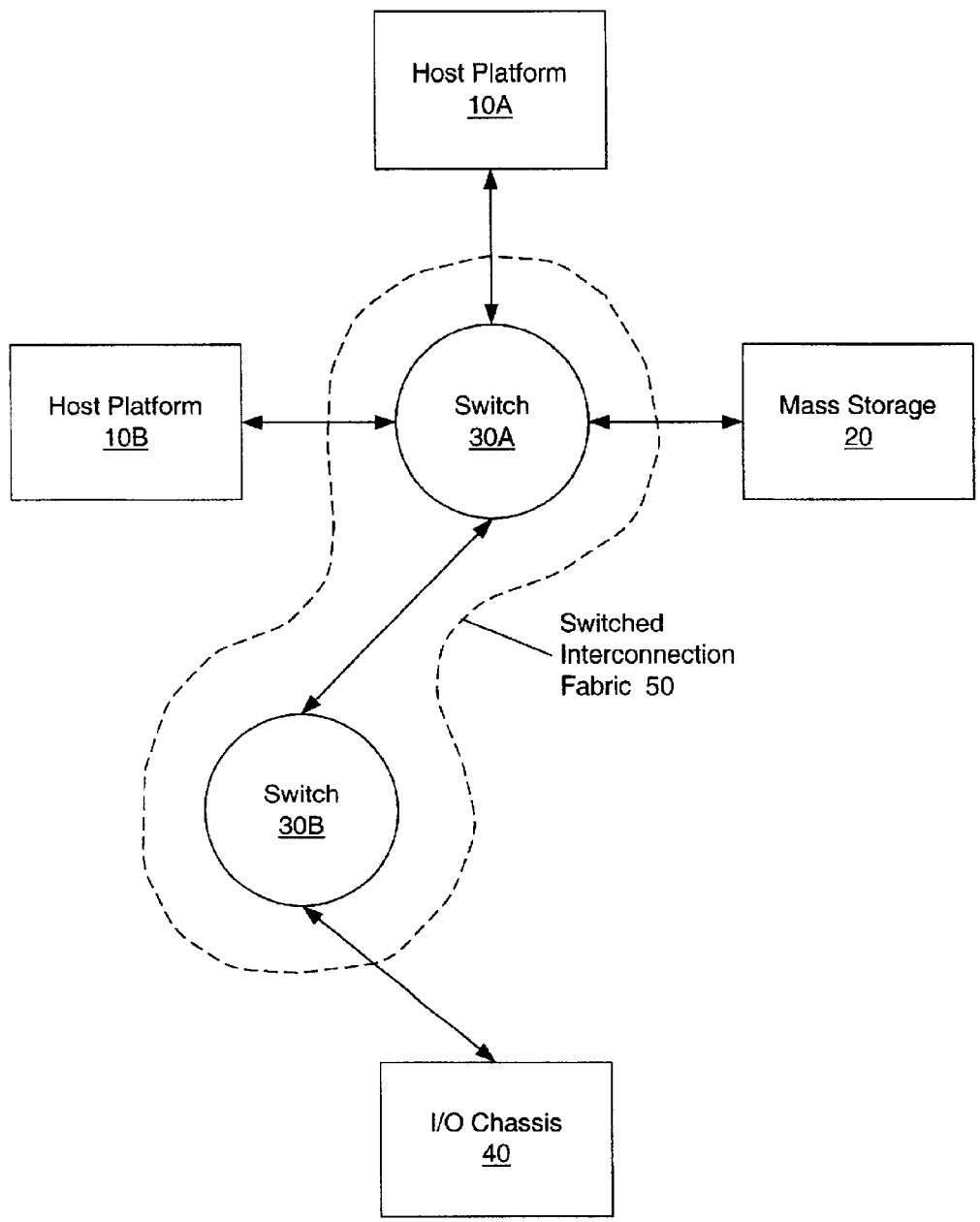
FIG. 1 is a block diagram of one embodiment of a computer network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a computer network is shown. The computer network includes a first host platform 10A, a second host platform 10B and a mass storage device 20 each interconnected by a switch 30A. Additionally, an input/output chassis 40 is connected to the network via a second switch 30B. Each of the devices connected by one of switch 30A or 30B may be referred to as an end node or simply a node. The network may be interconnected by a switched interconnection fabric 50.

In one embodiment, the switched interconnection fabric 50 is an Infiniband™ switched interconnection fabric. Host platform 10A and 10B may each be a computing node such as a personal computer or a workstation, for example. Host platform 10A and 10B may each run one or more client processes either independently or in a shared processing environment and may communicate with each other, with I/O chassis 40 and with mass storage 20 via switch 30A and switch 30B. I/O chassis 40 is an exemplary function that may include one or more types of input/output device controllers. Mass storage 20 may be one of many types of storage devices and may be configured as a stand-alone device or in an array such as a hard disk array, a random access memory array or a tape drive array. Switch 30A and 30B may be configured to receive and forward packets of information to the next destination. It is noted that in other embodiments, other configurations and numbers of devices are contemplated.

As will be described in more detail below, host platform 10 may include a hardware channel adapter, which physically connects host platform 10 to the Infiniband fabric and a software driver that provides a software interface between the operating system of host platform 10 and the hardware channel adapter. A host process running on host platform 10 may generate instructions that the hardware channel adapter ultimately executes.

Figure 2:
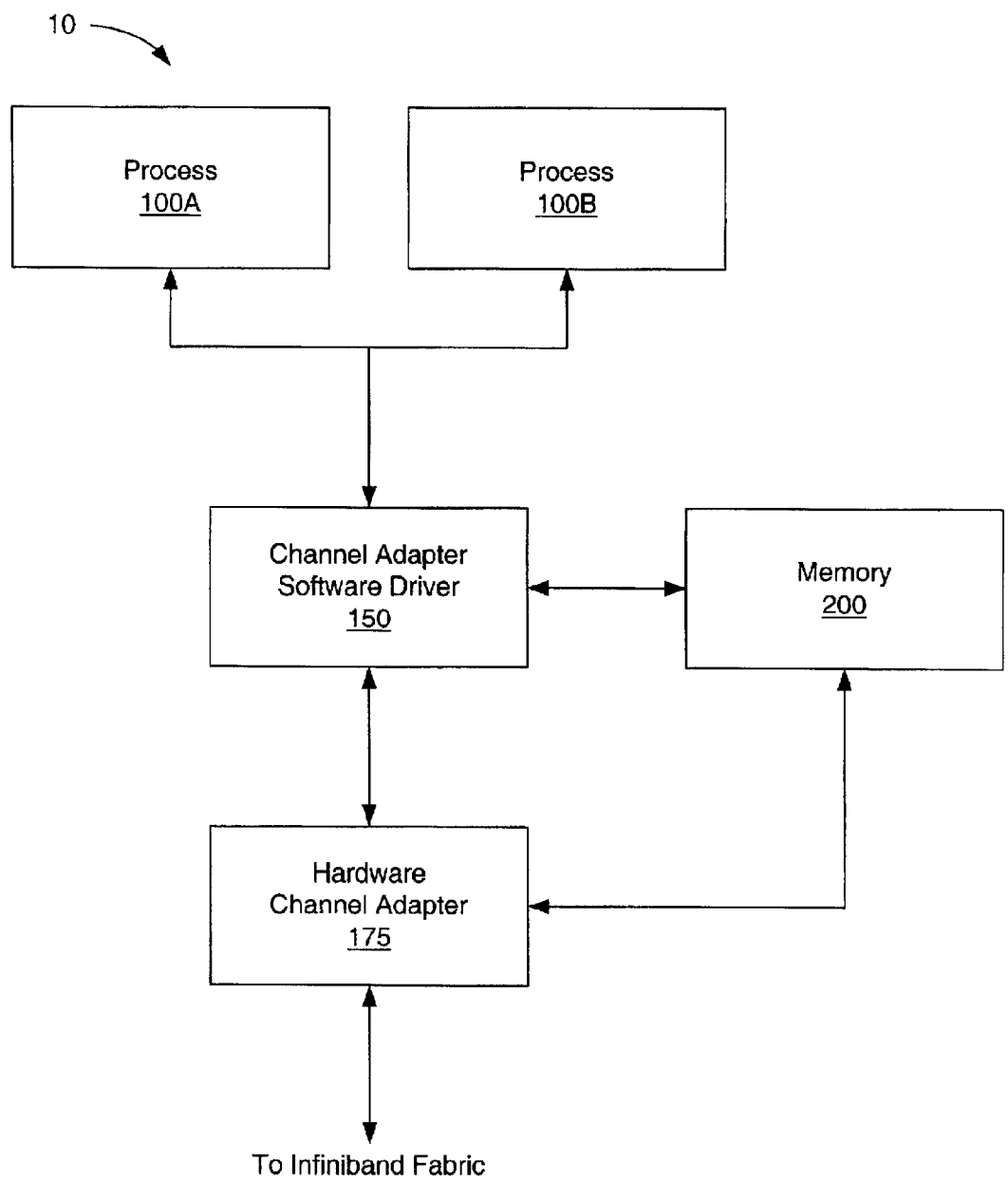
FIG. 2 is a functional block diagram of one embodiment of a host platform.

Referring to FIG. 2, a functional block diagram of one embodiment of a host platform 10 of FIG. 1 is shown. Host platform 10 may include one or more processors (not shown) that execute host processes such as process 100A and a process 100B. Process 100A and 100B are operatively coupled to a memory 200 through a channel adapter software driver 150. A hardware channel adapter 175 is coupled to software driver 150 and to memory 200.

In one embodiment, process 100A and 100B (hereafter 100) may generate instructions to be executed by hardware channel adapter 175. For example, process 100 may generate instructions to move data from one location in memory 200 to another location in memory 200. Additionally, process 100 may generate instructions to move data from one location in memory 200 to an additional memory located on another node.

In one particular implementation, process 100 makes a request to communicate to a particular device or process and software driver 150 may respond by allocating space in memory 200 to create a queue pair corresponding to that device or process. Each time process 100 makes a request for the hardware adapter to perform a particular function, software driver 150 places the request in the corresponding queue pair as a work queue element. Software driver 150 then notifies hardware adapter 175 that there is a work request in the queue. Software driver 150 may cause work queue elements to be stored in the queue pair in a sequential order until such time as the queue begins to fill up.

Hardware adapter 175 may be configured to fetch a work queue element from the queue pair in memory 200 and to execute the instructions contained therein. Hardware adapter 175 may service each work queue element in the order it is placed into the queue. However, the work queue element may not complete in the same order that it was executed. A completion queue (not shown) may hold a list of work queue elements that have completed and an indication may be presented to both hardware adapter 175 and software driver 150 indicating the availability of such free locations. As a work queue element completes, the location in the queue pair in which it was stored, may become available. Software driver 150 may place new work queue elements in these completed out of order queue locations. Thus, the combination of the hardware channel adapter 175 and software driver 150 may allow for work queue elements to be serviced in a first come first served manner even if the work queue elements become non-contiguous in memory due to the availability of free locations resulting from out of order completions and subsequent use of those free locations by software driver 150 as it adds new work queue elements to the queue. It is noted that software driver 150 may create the queue pairs and any associated software registers using a linked list data structure or any other form of data structure that may achieve similar operational characteristics as the implementations described herein.

Figures 3A, 3B:
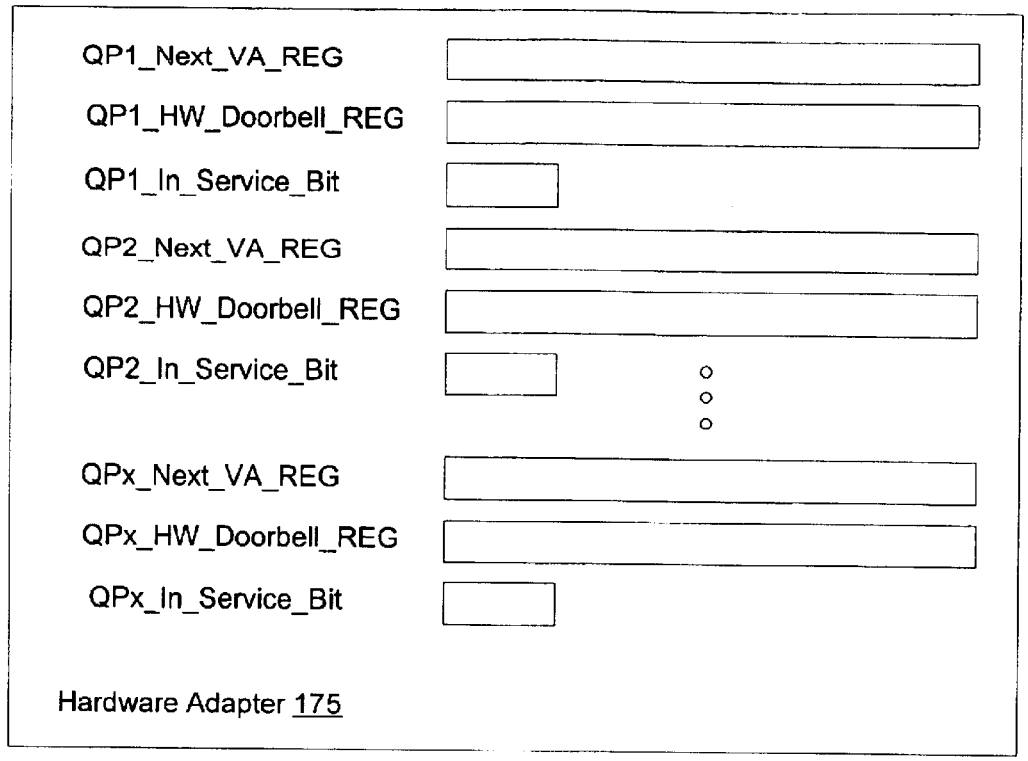
FIG. 3A is a diagram of one embodiment of a hardware channel adapter.
FIG. 3B is a diagram of one embodiment of a queue pair data structure.

Turning now to FIG. 3A, a diagram of one embodiment of the hardware channel adapter 175 of FIG. 2 is shown. Hardware channel adapter 175 of FIG. 3A includes a plurality of hardware registers for managing the work queue elements stored in various queue pairs in memory. In the illustrated embodiment, hardware channel adapter 175 includes a Next_VA_Reg, an HW_Doorbell_Reg and an In_Service_Bit for each corresponding queue pair that has been created by the software driver 150 of FIG. 2. For example, QP1_Next_VA_Reg corresponds to queue pair 1 and QP2_Next_VA_Reg corresponds to queue pair 2.

The Next_VA_Reg register is a hardware register used to store the virtual address of the next work queue element to be serviced by hardware channel adapter 175. The HW_Doorbell_Reg is a hardware register used to store a count of the number of work queue elements remaining to be serviced by hardware channel adapter 175. The In_Service_Bit is used to keep track of whether the work queue element at the address stored in the Next_VA_Reg register has been serviced. The In_Service_Bit, while set, indicates that the work queue element is still active in the fabric and has not yet completed. Thus preventing a work queue element from being serviced more than once Operation of hardware channel adapter 175 of FIG. 3A will be described in greater detail below.

Referring to FIG. 3B, a diagram of one embodiment of a queue pair 210 data structure is shown. Queue pair 210 is implemented in a group of memory locations and created by the software driver 150 of FIG. 2 to store information corresponding to work queue elements. In FIG. 3B, QPx 210 is representative of any number of queue pairs that may be created by software driver 150. In this exemplary diagram, QPx 210 includes four entries available for storing work queue elements and they are labeled WQE_VA0–3. Each entry in QPx 210 includes five fields: Virtual Address, Work Queue Element Information, Next Virtual Address, Next Work Queue Element Posted, and Busy. Additionally, a software register, Driver Last Work Queue Element Accessed 215 corresponding to QPx 210 is shown. In the illustrated embodiment, QPx 210 has four entries. It is contemplated that other embodiments may use more or less entries and there may be a Driver Last Work Queue Element Accessed register for each queue pair created by software driver 150. Operation of software driver 150 and the use of QPx 210 will be described in greater detail below.

Figure 4:
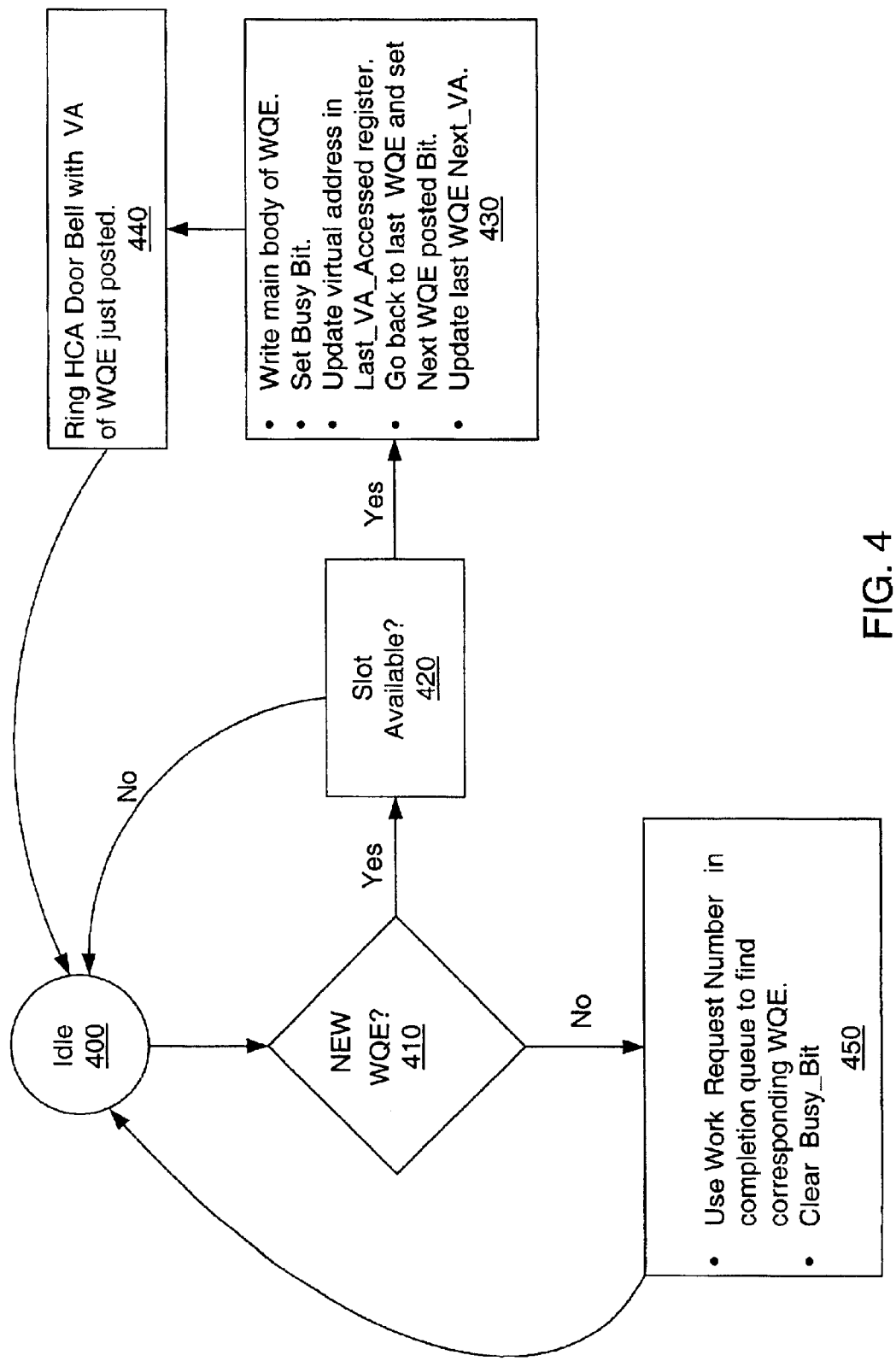
FIG. 4 is a flow diagram of the operation of one embodiment of a software driver.

Turning to FIG. 4, a flow diagram of the operation of one embodiment of software driver 150 of FIG. 2 is shown. Referring collectively to FIG. 2, FIG. 3A and FIG. 3B, the operation of software driver 150 of FIG. 2 is described. The flow diagram of FIG. 4 begins in step 400 where software driver 150 is in an idle state. If a new work request is made to software driver 150 or a work queue element completes, operation proceeds to step 410 where software driver 150 checks the request to see if the request is a new work request. If the request is not a new work request, operation proceeds to step 450 of FIG. 4 where software driver 150 checks a completion queue for the completed work queue element. Software driver 150 then clears the Busy bit 310 (e.g. the completion indicator) in FIG. 3B for that corresponding work queue element. Operation then proceeds back to step 400 of FIG. 4. Referring back to step 410, if the request is a new work request, then operation proceeds to step 420. In step 420, software driver 150 checks for an available location in a queue pair such as QPx 210 of FIG. 3B by checking the Busy bit 310 of each location in QPx 210. If there are no available locations, operation proceeds back to step 400 of FIG. 4 where software driver 150 may continue to try to deposit the new work queue element into QPx 210 at predetermined intervals. In step 420, if there are locations available such as location WQE_VA0, for example, then operation proceeds to step 430. In step 430, software driver 150 writes the work queue element into location WQE_VA0. Software driver 150 then sets the Busy bit 310, which indicates that this location is no longer available. Software driver 150 then writes the virtual address of the last location (e.g. WQE_VA0) in software register Last Work Queue Element Accessed 215 of FIG. 3B. Software driver 150 then goes back to location WQE_VA0 and sets the Next WQE Posted Bit and writes the virtual address of the next available location (e.g. WQE_VA1) into the Next Virtual Address field of QPx 210. Operation then proceeds to step 440 of FIG. 4. Software driver 150 rings the hardware doorbell by writing to a corresponding QPx HW_Doorbell_Reg of FIG. 3A, thus notifying hardware channel adapter 175 of a new work request. Operation then proceeds back to step 400.

Figure 5:
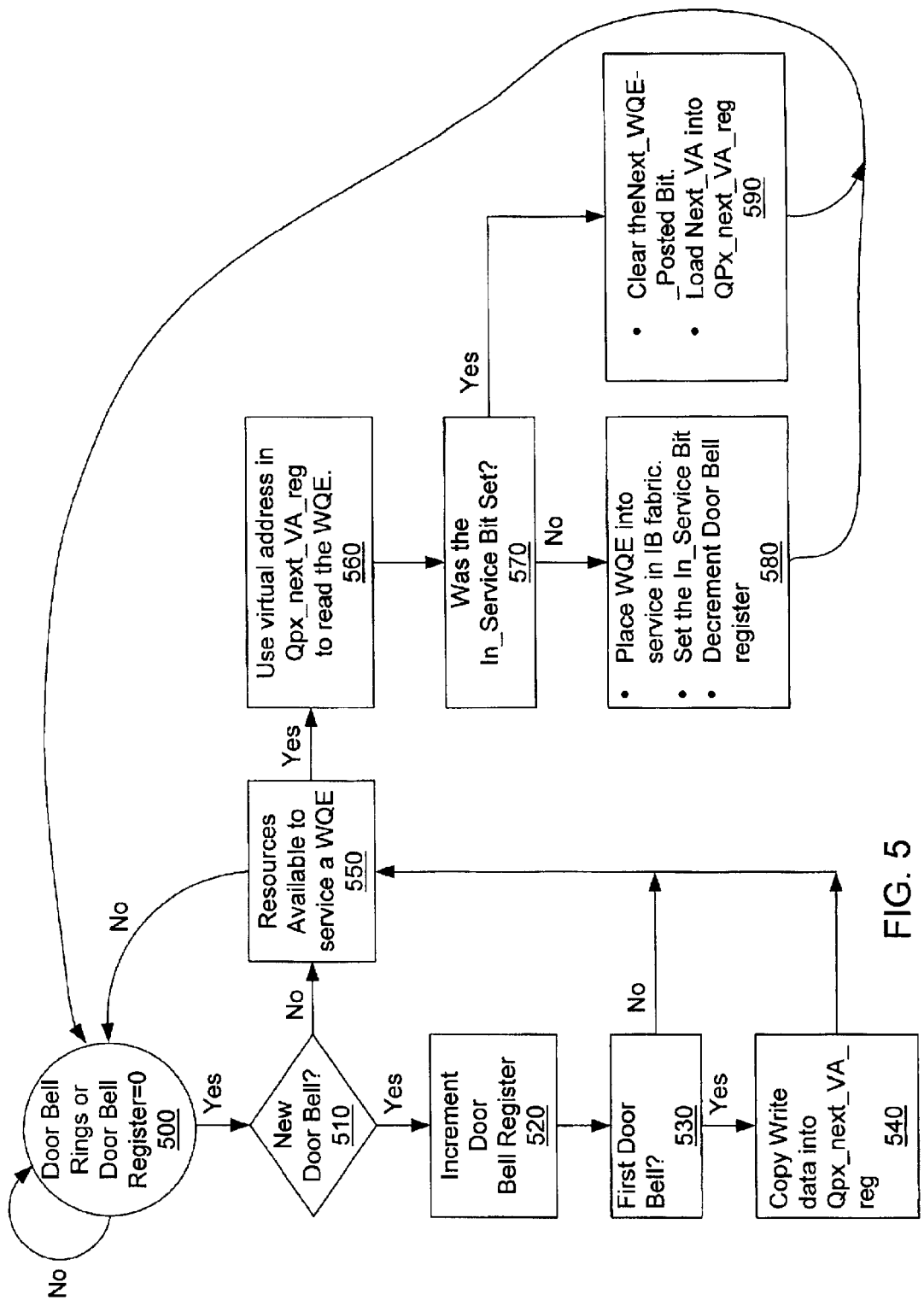
FIG. 5 is a flow diagram of the operation of one embodiment of a hardware channel adapter.

Referring now to FIG. 5, a flow diagram of the operation of one embodiment of hardware channel adapter 175 of FIG. 3A is shown. The operation of hardware channel adapter 175 begins in step 500 of FIG. 5. In step 500, hardware channel adapter 175 checks QPx HW_Doorbell_Reg of FIG. 3A see if the count is not equal to zero. If the count is zero, then operation stays in step 500. However, if the count is not zero, then operation proceeds to step 510 where hardware channel adapter 175 checks to see if there is a new doorbell by checking to see if software driver 150 has written to QPx_Next_VA_Reg of FIG. 3A. If there is a new doorbell, operation proceeds to step 520 of FIG. 5, where hardware channel adapter 175 increments the HW_Doorbell_Reg. Operation then proceeds to step 530, where hardware channel adapter 175 checks to see if it is the first doorbell ring for that queue pair. The first doorbell ring notifies the hardware of the starting point of that particular queue pair in memory. Since queue pairs and work queue elements may be a predetermined size, the hardware may now track where each successive work queue element is located. If it is not the first doorbell ring, operation proceeds to step 550. Going back to step 530, if it is the first doorbell ring, operation proceeds to step 540, where hardware channel adapter 175 copies data written to QPx_Next_VA_Reg of FIG. 3A into QPx_Next_VA_Reg and operation proceeds to step 550. Going back to step 510, if there is no new doorbell and the HW_Doorbell_Reg of FIG. 3A is not zero, operation proceeds to step 550 of FIG. 5. In step 550, hardware channel adapter 175 checks if necessary resources are available to service a work queue element. If the resources are not available, operation proceeds back to step 500. If the resources are available, operation proceeds to step 560 where hardware channel adapter 175 fetches the virtual address in QPx_Next_VA_Reg of FIG. 3A and reads the work queue element stored there. Operation then proceeds to step 570. Hardware channel adapter 175 then checks the In_Service_Bit of FIG. 3A. If the In_Service_Bit was not set, operation proceeds to step 580. In step 580, hardware channel adapter 175 places the work queue element into service, sets the In_Service_Bit of FIG. 3A and decrements the HW_Doorbell_Reg. Operation then proceeds back to step 500 of FIG. 5. Referring back to step 570, if the In_Service_Bit of FIG. 3A is set, then operation proceeds to step 590 of FIG. 5. In step 590, hardware channel adapter 175 clears the Next_WQE_Posted bit of FIG. 3B and loads the Next Virtual Address into QPx_Next_VA_Reg of FIG. 3A. Operation then preceeds back to step 500.

Numerous variations and modifications will become apparent to those skilled in the art once the disclosure is fully appreciated. It is intended that the following claims be interpreted to embrace all such variations and modifications.

What is claimed is:

1. An apparatus comprising:
   a software driver configured to cause a plurality of work queue elements to be stored in a queue pair including a plurality of storage locations;
   wherein each of said plurality of storage locations includes an indicator indicating whether a corresponding work queue element has been completed; and
   a hardware adapter configured to select one of said plurality of storage locations and to service a corresponding one of said plurality of work queue elements, and in response to completion of a task associated with said corresponding work queue element, to allow said indicator to indicate that said corresponding work queue element been completed;
   wherein said software driver is configured to cause a new work queue element to be stored in said selected one of said plurality of storage locations in response to detecting that said indicator indicates that said corresponding work queue element has been completed.

2. The apparatus as recited in claim 1, wherein said hardware adapter comprising a first register for storing a virtual address of said selected one of said plurality of storage locations and said corresponding work queue element.

3. The apparatus as recited in claim 2, wherein said software driver is further configured to notify said hardware adapter when said new work queue element is stored by causing said virtual address of said new work queue element to be written to said first register of said hardware adapter.

4. The apparatus as recited in claim 3, wherein said hardware adapter further comprising a second register for indicating a number of pending work queue elements remaining to be serviced.

5. The apparatus as recited in claim 4, wherein said hardware adapter is further configured to increment said second register in response to receiving said notification from said software driver.

6. The apparatus as recited in claim 2, wherein said hardware adapter further comprising an in-service bit for indicating whether said selected work queue element corresponding to said virtual address in said first register has been serviced.

7. The apparatus as recited in claim 1, wherein said software driver is further configured to allocate said plurality of storage locations in a memory for said queue pair.

8. The apparatus as recited in claim 7, wherein said software driver is further configured to allocate additional pluralities of storage locations in said memory for a plurality of additional queue pairs.

9. A system comprising:
one or more processors;
a memory operatively coupled to said processor; and
an apparatus including:
a software driver configured to cause a plurality of work queue elements to be stored in a queue pair including a plurality of storage locations;
wherein each of said plurality of storage locations includes an indicator indicating whether a corresponding work queue element has been completed; and
a hardware adapter configured to select one of said plurality of storage locations and to service a corresponding one of said plurality of work queue elements, and in response to completion of a task associated with said corresponding work queue element, to allow said indicator to indicate that said corresponding work queue element has been completed;
wherein said software driver is configured to cause a new work queue element to be stored in said selected one of said plurality of storage locations in response to detecting that said indicator indicates that said corresponding work queue element has been completed.

10. The system as recited in claim 9, wherein said hardware adapter comprising a first register for storing a virtual address of said selected one of said plurality of storage locations and said corresponding work queue element.

11. The system as recited in claim 10, wherein said software driver is further configured to notify said hardware adapter when said new work queue element is stored by causing said virtual address of said new work queue element to be written to said first register of said hardware adapter.

12. The system as recited in claim 11, wherein said hardware adapter further comprising a second register for indicating a number of pending work queue elements remaining to be serviced.

13. The system as recited claim 12, wherein said hardware adapter is further configured to increment said second register in response to receiving said notification from said software driver.

14. The system as recited claim 10, wherein said hardware adapter further comprising an in-service bit for indicating whether said selected work queue element corresponding to said virtual address in said first register has been serviced.

15. The system as recited in claim 9, wherein said software driver is further configured to allocate said plurality of storage locations in said memory for said queue pair in response to a request from said one or more processors.

16. The system as recited in claim 9, wherein said software driver is further configured to allocate additional pluralities of storage locations in said memory for a plurality of additional queue pairs in response to a plurality of requests from said one or more processors.

17. A method comprising:
storing a plurality of work queue elements in a queue pair including a plurality of storage locations;
selecting one of said plurality of storage locations and servicing a corresponding one of said plurality of work queue elements;
providing an indicator in each of said plurality of storage locations to indicate that a corresponding work queue element has been completed;
in response to completion of a task associated with said corresponding work queue element, a hardware adapter allowing a software driver to set said indicator to indicate that said corresponding work queue element has been completed;
storing a new work queue element in a selected storage location in response to detecting that said indicator indicates that said corresponding work queue element has been completed.

18. The method as recited in claim 17, further comprising storing a virtual address of said selected storage location and said corresponding work queue element in a first register.

19. The method as recited in claim 18, further comprising notifying a hardware adapter when said new work queue element is stored by writing said virtual address of said new work queue element to said first register.

20. The method as recited in claim 19, further comprising indicating in a second register, a number of pending work queue elements remaining to be serviced.

21. The method as recited in claim 20, further comprising incrementing said second register in response to receiving said notification.

22. The method as recited in claim 18, further comprising indicating in an in-service bit, whether said selected work queue element corresponding to said virtual address in said first register has been serviced.

23. The method as recited in claim 17, further comprising allocating said plurality of storage locations in a memory for said queue pair in response to a request from one or more processors.

24. The method as recited in claim 23, further comprising allocating additional pluralities of storage locations in said memory for a plurality of additional queue pairs in response to a plurality of additional requests from said one or more processors.

* * * * *